1) Sliding sleeve of 6-polyamide
2) Sliding sleeve of 6:6-polyamide
3) Sliding sleeve of polypropylene a) Sliding sleeve of polypropylene
b) Sliding sleeve of polypropylene foamed and stored in oil

INVENTORS.
WERNER HARTMANN
DIETRICH SCHLEEDE
FELIX SCHÜLDE
BY
ATTORNEY.

1) Sliding sleeve of 6-polyamide
2) Sliding sleeve of 6:6-polyamide
3) Sliding sleeve of polypropylene United States Patent Office 3,431,203
Patented Mar. 4, 1969

3,431,203
FRICTION BEARING OF THERMOPLASTIC MATERIAL AND PROCESS OF MAKING SAME
Werner Hartmann, Karlsruhe, Baden, Dietrich Schleede, Frankfurt am Main, and Felix Schülde, Neuenhain, Taunus, Germany, assignors to G. M. Pfaff A.G., Kaiserslautern, and Farbwerke Hoechst A.G., Frankfurt am Main, Hochst, Germany, both corporations of Germany
Continuation-in-part of applications Ser. No. 291,175, June 27, 1963, and Ser. No. 328,568, Dec. 6, 1963. This application Apr. 5, 1967, Ser. No. 628,731
U.S. Cl. 252—12.2     15 Claims
Int. Cl. C10m 7/25, 7/14

ABSTRACT OF THE DISCLOSURE

Self-lubricating thermoplastic bearing material and slide guides, e.g. bearings for machines and other load bearing and frictionless structures, made of such material. The bearing material comprises a closed-pore type of porous polyolefin impregnated with a flowable lubricant which is occluded in the closed pores and which exudes during the operation of the bearing to lubricate the bearing material surface. The polyolefin preferably is polypropylene, low-pressure polyethylene, or a copolymer of ethylene or propylene with a minor amount of another monomer.

RELATED APPLICATIONS

This application is a continuation-in-part application of copending applications Ser. No. 291,175, filed June 27, 1963 and application Ser. No. 328,568, filed Dec. 6, 1963, both of which are now abandoned.

SUMMARY OF THE INVENTION

The present invention relates to self-lubricating thermoplastic bearing material and to slide guides made from such material, particularly low-friction machine and apparatus bearings and sliding surfaces which are maintenance-free in use, and to the processes of making such material and articles. More particularly, the invention relates to a self-lubricating bearing material containing an internally occluded lubricant. The material is made by a process which comprises impregnating a porous polyolefin having closed pores with a flowable lubricant which penetrates into and becomes occluded in the closed pores of the polyolefin. During operation of the bearing and its use, the lubricant is released gradually to the surface of the polyolefin, especially when the lubricant-impregnated polyolefin is in operation, as that of a bearing. The polyolefin is preferably polypropylene, low-pressure polyethylene, or a copolymer of ethylene or propylene with a minor amount of another monomer, preferably tetrafluoroethylene, trifluorochloroethylene, or trifluoroethylene.

The self-lubricating (also referred herein as self-lubricated) bearing material is preferably made by expanding, e.g., gas blowing, the polyolefin to make a closed-pore form of porous polyolefin, simultaneously or substantially immediately thereafter shaping the polyolefin, and then treating the porous polyolefin with a heated lubricant oil until the pores take up an adequate amount of the oil. The polyolefin can be shaped directly into the desired shape of the end-product, e.g., a cylindrical bushing bearing; and the bearing then treated with the lubricant. Also, the polyolefin can be machined to any desired shape before treatment, or the treated material can be machined to the desired shape.

The self-lubricated bearing material and slide guides made therefrom are especially useful in isolated, sealed locations where attention-free, long service-life is required for lubricating purposes. Bearings of the invention are especially useful in service such as sewing machines or food machinery where freedom from contamination by lubricant is essential.

Self-lubricated slide guides of polyolefins can be made, for example, by the methods usually employed in the manufacture of thermoplastic materials, for example by extrusion or injection-molding. The injection-molded self-lubricated slide guides possess a sufficient dimensional accuracy for most purposes without alteration.

DESCRIPTION OF SEVERAL VIEWS OF DRAWING

Figure 1:
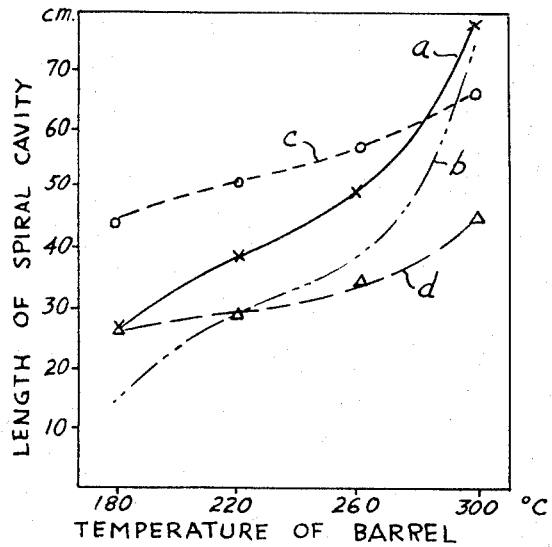
Figure 2:
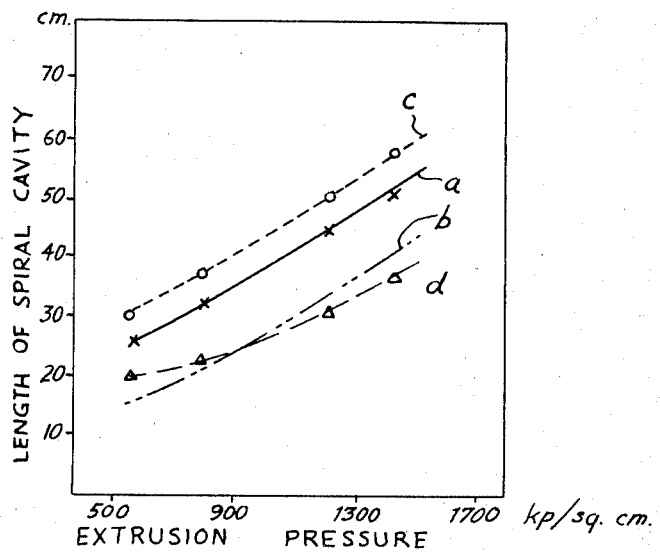

The relationships between flowability of polypropylene and of low-pressure polyethylene under constant pressure and under constant temperature conditions are shown in the drawing in which FIGURE 1 is a chart showing increase in extruder barrel temperature with increase of length of spiral cavity at constant temperature, and FIGURE 2 is a chart showing increase in extrusion pressure with increase of length of spiral cavity of the extruder at constant temperature.

Figure 3:
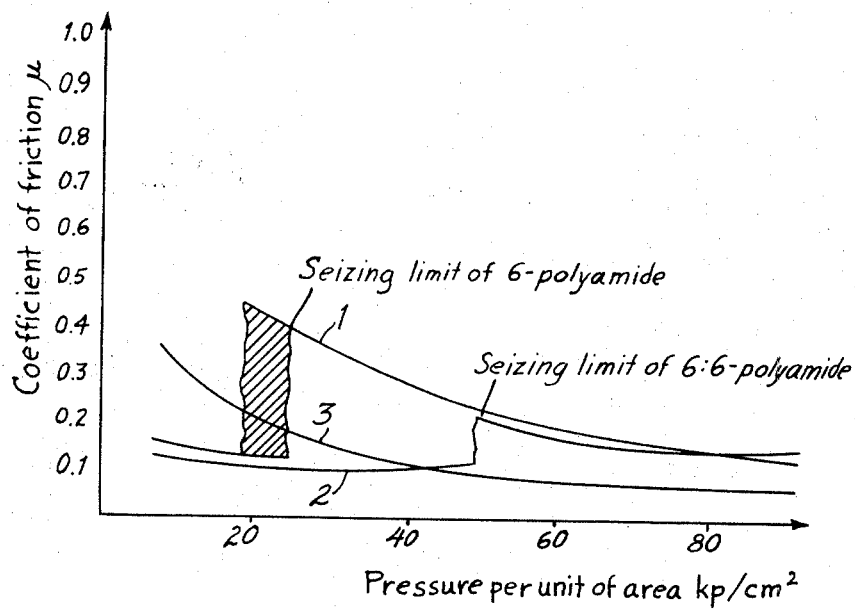
Figure 5:
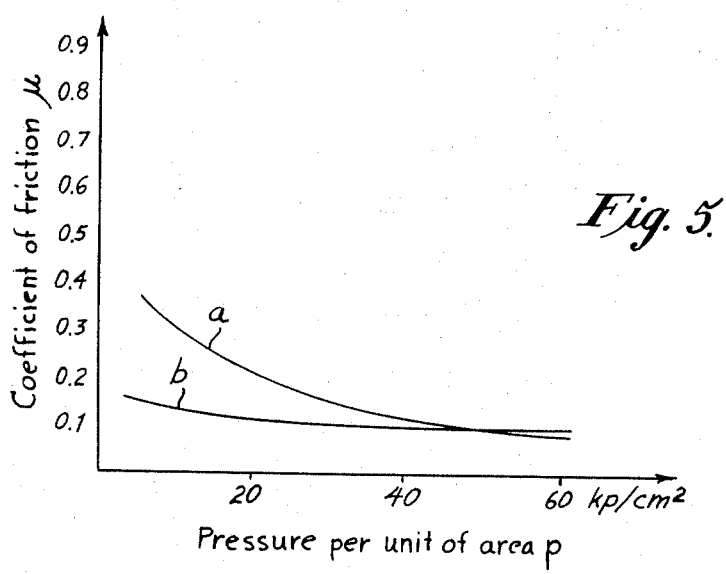
Figure 4:
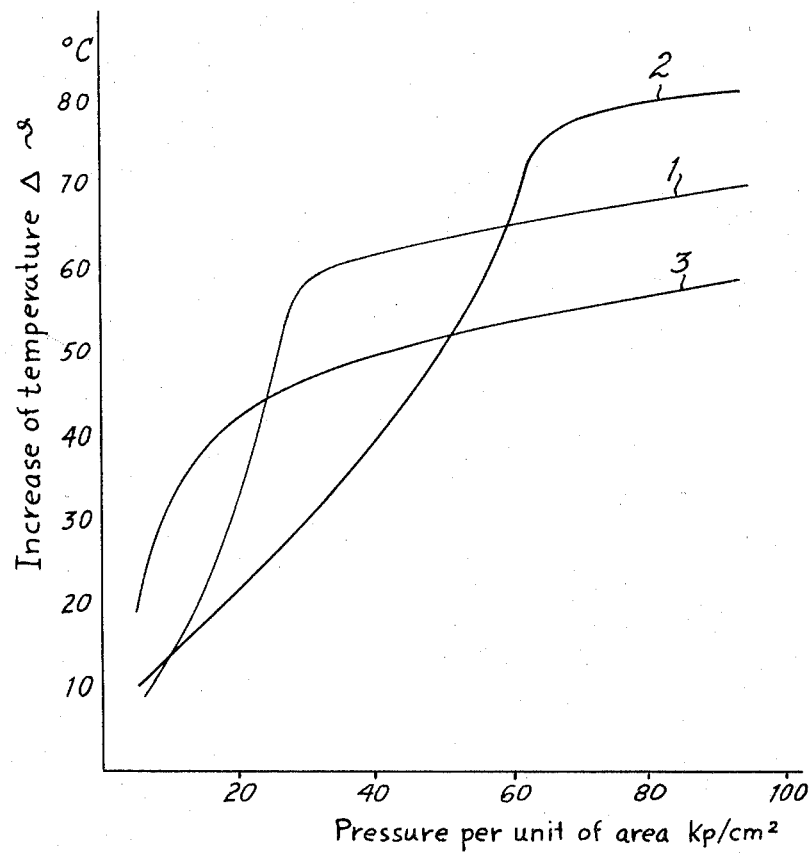

The advantages of polypropylene as a bearing bushing material is shown in the accompanying drawing in which FIGURE 3 is a chart showing a comparison between the coefficients of friction of polypropylene, 6-polyamide and 6:6-polyamide at increasing pressures;

FIGURE 4 is a chart showing a comparison between temperature increases of polypropylene, 6-polyamide and 6:6-polyamide at increasing pressures; and FIGURE 5 is a chart showing a comparison between the coefficients of friction of polypropylene and of polypropylene which has been foamed and lubricated according to the invention.

DETAILED DESCRIPTION OF INVENTION

A growing demand exists for maintenance-free bearings in modern industry. Without attendance and lubrication, conventional slide guides with metallic sliding surfaces rapidly lose their capacity of functioning. Others have previously proposed to use sintered metallic bearings which have been impregnated with lubricants by special processes before being used.

Such previously known friction bearings or surfaces which require attendance only occasionally or not at all have been made in the following manner. Metal powder was compressed under high pressure to a solid body at a temperature, whereby sintering took place. Such high pressure and heating produced fine pores in the structure of of the compressed body. These pores were subsequently filled with a lubricant in a high vacuum. Such sintered highly porous, compressed metal bearings, however, do not function properly under emergency conditions when the lubricant has been used up, and immediately cause seizing of the shaft due to the characteristic properties of the material of which they consist and to the roughness of their surfaces. Said bearings possess a very high heat and cold conductivity and, due thereto, the undesired property to act as a brake, when cold, due to the high viscosity of the lubricant at a low temperature. At an elevated temperature, the lubricant tends to run out from such bearings so that they cannot be used at a temperature exceeding about 60° C. Lubricants which are adjusted in their properties to the temperature range encountered in nature and which are also resistant to heat generated by mechanical friction, however, are not yet available. The present known lubricants must always be employed at their specific small ranges of resistance to heat and cold. Bearings, however, are fixed parts of a machine or vehicle. As such they cannot be exchanged and replaced when required by variations in temperature. Therefore, the usefulness of the machine or the vehicle provided with such bearings is rather limited.

Another method of prolonging the attendance-free service life of bearings consists in making the bearing of plastic material which has a high sliding ability. Such plastic material is, for instance, a polyamide or polytetrafluoroethylene. The latter plastic, however, has proved to be very difficultly workable to bearings so that its only advantage is its high thermal stability. Working polytetrafluoroethylene according to the transfer molding process is so difficult that the manufacture of bearings from such a material can be carried out on a small scale only. This is due to the fact that polytetrafluoroethylene is not a thermoplastic material but is crystalline. It is converted at a temperature of 325° C. into a gel-like non-flowing mass, thereby expanding by 25%. It must then be molded under a pressure of 200 kg. to 300 kg./sq. cm. while completely excluding dust and slowly increasing the temperature to 380° C. The resulting bearing has a density of at least 2.0. Due to the chemical composition of polytetrafluoroethylene it is possible that the shaft material may be corroded by said plastic. Furthermore, polytetrafluoroethylene and other fluorine-containing polymers are not sufficiently stable under extended periods of operation because they are relatively easily deformed under the influence of pressure. Yet these plastics have excellent sliding properties.

Polyamide bearings, which are most frequently used, have the disadvantage that the material reversibly absorbs or gives off water, depending on the moisture content of the environment. Since water is the natural plasticizer for polyamide, the mechanical properties and the volume of the polyamide, vary with the water content. Changes in volume have, in turn, a strongly negative effect on the bearing clearance. The application of polyamide bearings is therefore strongly limited.

A mixture of polypropylene, polytetrafluoroethylene, bronze and lead has also been suggested as material for bearings. This material, however, still requires the use of a lubricant although it operates under emergency conditions, when the lubricant has been consumed. Another disadvantage of such a material is that it is adversely affected by copper, manganese, cobalt, and their alloys. Thus such bearings are not only subjected to normal wear and tear but are also corroded due to their incompatibility with the above mentioned metals and alloys.

The preparation of bearings of solid ethylene polymer made from ethylene polymerized at high pressure is disclosed in U.S. Patent 2,246,092. The patent discloses that liquid lubricants, such as plasticizers and high boiling liquid paraffins, may be blended with the solid polymer to reduce frictional forces, in the manner used to add other compounding ingredients, for example solid fillers and solid lubricants.

The use of resinous, open-pored foams, such as open-pored polyurethanes, polyethylene and polystyrene foams, as reservoirs for oil, and intended to be used as a means to lubricate adjacent surfaces, e.g., those of bearings or slide surfaces, is disclosed in U.S. Patent 3,190,842.

However, heretofore, the preparation and use as a bearing material of a composition of matter comprising a closed-pore polyolefin having oil occluded in its closed-pores has not been known. It was unexpected to find that a flowable lubricant, such as lubricating oil, could be made to penetrate into closed pores of a polyolefin. Also, it was unexpected to find that the lubricating oil becomes available gradually or sustainedly oozes to the bearing surface, thus providing an essentially frictionless surface.

It is one object of the present invention to provide a bearing material which is free of the disadvantages encountered heretofore.

Another object of the present invention is to provide a process of making highly resistant slide guides, e.g. friction bearings and bearing surfaces, in a simple and effective manner.

Other objects of the present invention and advantageous features thereof will become apparent as the description proceeds.

The bearing materials and the bearings and other sliding surfaces according to the present invention are composed of polyolefins and more particularly of polypropylene and low-pressure polyethylene in the closed-pore state and containing flowable lubricants. It was found that high-pressure polyethylene as well as other polyolefins are not suitable as bearing material because they are relatively soft materials.

Slide guides of polyolefins, preferably of polypropylene, for example, bearing bushings, roller bearings, bearing boxes, and sliding linings are maintenance-free, up to medium sliding speeds, under loads which are appropriate for the material involved. They are self-lubricating and do not lose their good sliding properties even when exposed to unfavorable outdoor climatic conditions. Nevertheless, both the lives and utilities of slide guides made of a polyolefin, especially polypropylene, can be remarkably extended when the polyolefin is a closed-pore porous polyolefin which has been prepared and impregnated with a flowable lubricant according to the invention.

As polyolefins there may advantageously be used low-pressure polyethylenes having a density of 0.95 to 0.97 and polypropylenes having a density of 0.90 to 0.91, preferably those obtained by the processes of Ziegler and Natta (cf. Raff-Allison, "Polyethylene," 1956, pp. 72–81, edited by Interscience Publishers, New York, which is incorporated herein by reference).

The preferred polypropylene is a plastic material obtained according to the Natta process. Its specific gravity is about 0.91. The isotactic polypropylene has proved to be the most suitable material, because its strength, properties and softening point render it especially useful as bearing material.

Those low-pressure polyethylenes which have a specific gravity between about 0.94 and about 0.95 and a crystallinity of 60% to 75% as they are obtained by means of the Zeigler catalysts also have proved to be particularly valuable bearing materials.

In general it was found that, of the suitable polyolefins, those having a higher specific gravity and a higher degree of crystallinity exhibit a greater resistance to continuous pressure stresses.

Homopolymers of the ethylene and propylene are preferably used for practice of the invention. However, copolymers of ethylene or of propylene with a minor amount of a comonomer can also be used to make a copolymer which can be foamed to a closed-pore bearing material which then can be impregnated with a flowable lubricant to make the self-lubricated bearing materal and slide guides of this invention. The prepared copolymer preferably should have properties similar to those of polyethylene and polypropylene, as discussed above. The amount of comonomer in the copolymer can range from about 0.01 to about 49% based on the weight of copolymer. An amount of from about 0.05 to 20% is preferable. Preferably the comonomer is trifluoroethylene which is copolymerized either with ethylene or propylene, but preferably with propylene, to form a copolymer containing from about 10 to 20% by weight polytrifluoroethylene. Also preferred is tetraflouoethylene which likewise is copolymerized with ethylene or propylene, preferably ethylene, to form a copolymer containing from about 0.05 to 20% by weight of polytetrafluoroethylene. Likewise preferred is trifluorochloroethylene, copolymerized with ethylene or propylene, preferably ethylene, to form a copolymer containing from about 10 to 20% by weight of polytrifluorochloroethylene. In general, any solid polymer of an aliphatic mono-1-olefin which can be made into a closed-pore form of polyolefin suitable for a slide guide, which will absorb, retain occluded in its pores, and release under stress or friction a flowable lubricant, and which will also provide the physical attributes such as mechanical strength and rigidity required in a bearing can be used to practice the invention.

Both polypropylene and low-pressure polyethylene have the property of being permeable to and impregnable by flowable lubricants so that each material can be impregnated with oil even if it is not of porous structure. Surprisingly, porous polypropylene and low-pressure polyethylene are capable of absorbing larger amounts of lubricant in the pores although they are closed, most probably because the vacuum created in the pores on cooling permits penetration of the lubricant into the pores, thus creating an occluded lubricant reservoir which is gradually used up. Still more surprisingly, the occluded oil is releasable to the surface of the polyolefin to serve as a lubricant. Thus a bearing material is produced which has a long service life and does not need extensive attendance.

It may be mentioned that the porous polypropylene or low-pressure polyethylene should have a comparatively low number of pores so that it is as rigid and hard as the pore-free polyolefin. To many pores in the polyolefin render said plastic too soft, so that it cannot be used for bearings. The appearance of the porous polyolefin according to the present invention is about the same as that of non-porous polyolefin, i.e. the pores cannot be recognized on superficial inspection. However, upon slicing open a portion of a bearing made from the bearing material of the invention, and examining the exposed inner surfaces under a microscope, the occluded oil can be observed to be present in the closed pores.

Preferably, the molecular weight of polypropylene or low-pressure polyethylene is about 80,000 although polyolefins of somewhat lower or higher molecular weight may also be used.

Bearings of polypropylene or low-pressure polyethylene and their copolymeric variants impregnated with lubricants not only possess excellent sliding properties due to their low coefficients of friction but they have such a prolonged service life that they do not require any attendance whatsoever. Due to the oleophilic properties of the polyolefins the lubricant is continuously exuded during the operation of the bearing from its inside or, respectively, from the interiorly positioned pores to the bearing surface and thus diffuses to and supplies said surface continuously with lubricant. Since the polyolefins as such have excellent anti-friction properties, only very small amounts of lubricant are required for a satisfactory lubrication of the sliding surface.

The number of pores in such a polyolefin bearing material can readily be adjusted to the contemplated use of the bearing. The pore volume in the bearing material may amount to between about 4%, by volume, and about 40%, by volume, depending upon the period of time during which the bearing shall not require attendance, or respectively upon the bearing pressure.

Such a bearing material according to the present invention permits, for the first time, mass production of bearings with an extremely high degree of accuracy by means of the transfer molding process. The degree of accuracy is so high that bearings of the R7 group (according to 13A tables) can be produced. No appreciable change in dimensions was observed when exposing such a bearing according to the present invention to varying climatic conditions for six months. Furthermore, the lubricant does not run out or flow more rapidly from the bearing or, respectively, from the pores toward the shaft when the temperature of the shaft increases due to friction. This is explained by the fact that thermoplastic materials, in general, are poor heat conductors so that the heat generated on rotation of the shaft in the bearing does not penetrate more than about 10% of the entire bearing volume.

An abrasion resistance of 14 was determined at a load of 1000 g. of lead–CS–17 and at a dimension of mg./1000 revolutions according to the test method ASTM–D 1044 while using a standard rod. The dynamic coefficient of friction against steel without lubrication, determined according to the ASTM method was 0.15 when using a standard rod; 0.16 when using brass; and 0.20 when using aluminum. These values were obtained at a temperature of 20° C. and a relative humidity of 65%.

As stated hereinabove, the pore content of the bearing material may vary between about 4%, by volume, and about 40%, by volume, depending upon the period of time during which the bearing is not to be attended and also depending upon the load and pressure to which the bearing is exposed. Thus for the first time the possibility exists to adjust plastic bearings of remarkably high dimensional stability exactly to their intended use.

Methods for preparing an unicellular foamed olefin polymer are known and many of such methods may advantageously be used in accordance with the requirements of the present invention. See, for example, U.S. Patent 3,213,071. The following is a description of a preferred method of making the lubricated bearing.

In order to provide the polyolefin and especially the polypropylene with pores, a blowing agent, or expanding agent, is incorporated thereinto and the resulting mixture is heated to the expanding temperature of the blowing agent. Preferably, a blowing agent which generates gases at a temperature above the softening temperature of said plastics is used for high melting thermoplastics such as polypropylene. Thus, azo-dicarbonamide, also designated as azo-bis-formamide, which decomposes between 200° C. and 220° C. is preferably used for foaming polypropylene. Likewise, trihydrazinotriazine, which decomposes with gas generation at about 230° C., can be employed as blowing agent. N,N$^1$-dinitroso pentamethylene tetramine may also be used. It has a decomposition temperature of 195° C.

Other expanding agents which may be used advantageously include nitro urea, nitro urea methylamine. phenylmethyl-urethan-para-sulfon-hydrazide, terephthalazide, trihydrazinotriazine, azo-dicarbonamide and barium salt of azo-dicarboxylic acid. Azo-dicarbonamide was found to be especially useful.

The amount of blowing agent to be added in order to produce the above mentioned porosity of the plastic material and especially of polypropylene may vary considerably. 0.01 part, by weight, to 3 parts, by weight, and more of the blowing agent may be admixed to 100 parts, by weight, of the plastic material. In general, an amount between about 0.1 part, by weight, and 1 part, by weight, of the blowing agent is sufficient. The amount of blowing agent to be added depends upon various factors, for instance, upon the temperature at which foaming proceeds, upon the counter pressure to which the foaming plastic is exposed, and upon the period of time required for foaming. The pore volume depends, among others, also upon the presence or absence of activators which may be added together with the blowing agent. Organic or inorganic activator compounds, for instance, lead, zinc, or cadmium compounds serve as such activators. When using azo-dicarbonamide as blowing agent, urea, biuret, ethanolamine, borax, zinc oxide, zinc octoate and basic lead salts, such as carbonates, phthalates, phosphites, and stearates, may be added as activators. Glycols may also be used for this purpose.

Such activators (also called "kickers") are added in about the same amounts as the blowing agent. Admixture of the blowing agent, especially to polypropylene, is rather difficult because polypropylene softens at about 170° C. The mixing temperature, therefore, must still be higher, namely at about 190° C. or even higher. However, many blowing agents start to decompose and to liberate gases at such a temperature especially when activating agents are admixed to the plastics. Therefore, only the above mentioned blowing agents reliably can be used.

The addition of the expanding agent can be effected in such a way that the polyolefin granules are moistened with butyl stearate and subsequently coated with the pulverulent expanding agent in a drum. The polyolefin granules can be treated with the expanding agent by coating the granules with a solution or dispersion comprising the expanding agent, a solvent or a dispersion medium and a rubber-like ethene/propene copolymer. The pulverulent expanding agent can be mixed with the pulverulent polyolefin at temperatures below the softening point. This mixture is subsequently granulated below said temperature. Besides conventional stabilizers, the polyolefins may contain fillers, pigments, dyestuffs, and other usual additives.

The plastic material mixed with the blowing agent may be molded by extrusion, injection, or respectively, jet molding to intermediate articles or semi-finished products, i.e., at elevated temperature followed by cooling, whereby pores are produced. Such semi-finished products are obtained in the form of porous blocks, rods, tubes, and the like. Bearings and sliding surfaces are produced from such semifinished articles by machining or cutting following the molding and foaming process. The plastic containing the blowing agent may also be molded according to the transfer molding process to yield articles which do not require further finishing or re-machining. Both compression and transfer-compression molding processes can be used.

The following data have been obtained in tests with the material according to the present invention when subjected to the extruding process or to the transfer molding process.

(a) Production of semi-finished articles by means of the extrusion process.

Conventional extruders of preferably 20–25D screw length are used for extruding the plastic material according to the present invention. The preferred extruder, when extruding polypropylene and polyethylene, is the extruder with the so-called short compression screw having a screw lead of 3:1 to 4:1. Such a short compression screw assures pulsation-free working of the extruder at increased output.

However, simple screws with a core of progressive diameter yield also satisfactory results. Highly satisfactory semi-finished polypropylene articles are obtained with such screws at the following operating temperatures: The barrel is heated to 200° C. (near the hopper), 210–240° C., and 210–240° C. (near the extrusion head) at three different zones. The head is heated at two different zones to 210–240° C. and 200–230° C.

When using polyethylene, the temperature at the orifice is increased from 160° C. to 240° C. and the temperature at the feeding zone from 110° C. to 180° C.

Bearings and parts of bearings produced in this manner are impregnated with the lubricant, especially with a lubricating oil such as spindle oil, by immersing them into the oil bath. Depending upon the thickness of the walls of the bearing, varying impregnating times are required. Impregnation of the bearings or parts of bearings is accelerated by heating the oil or, respectively, the lubricant in which they are immersed. Thereby, care must be taken that the temperature of the heated oil is not higher than the softening temperature of the plastic. Therefore, a temperature of about 160° C. should not be exceeded. When using light spindle oil for impregnation, it is the preferred procedure to carry out such impregnation at or just below its boiling temperature. Satisfactory impregnation may be achieved within a period of time between about 30 minutes and about 24 hours or even more. Of course, thinly viscous lubricating oils may be replaced by more viscous lubricants, for instance, petrolatum-like products. The use of such more viscous lubricants, of course, requires prolonged impregnation. Nevertheless, the procedure is recommended for bearings which are intended to operate at higher temperatures.

The bearings manufactured according to the present invention can absorb up to 20%, by weight, of oil or even more, so that additional lubrication is not required. Since the pores are closed, the oil cannot run off when the temperature is increased. Water which may enter the bearing is not harmful in contrast to metal bearings. Increase in temperature of the plastic also does not cause undesired deformation due to the porosity of the bearing.

(b) Production of bearings and parts thereof by means of the transfer molding process.

The temperature at which polyethylene and polypropylene are processed by transfer molding is between about 170° C. and about 300° C. When using plunger molds, the temperature should preferably not exceed 250° C. and when using screw molds it should not be higher than 200° C. The orifice is preferably a sealing orifice. Its temperature must be about 50° C. below the temperature of the plunger. The heat supplied to the mold is preferably controlled and adjusted by means of a hoop-drop relay (chopper bar controller) so as to assure highest uniformity of the finished product. The pressure under which the plastic is extruded should be at the maximum capacity of the extruder and should not be below 900 kg./sq. cm.

The forward movement of the plunger should correspond to the maximum speed of the machine. The molding temperature should not be below 60° C. not above 65° C.

The attached drawings represent curves which illustrate the relationship between flowability of polypropylene and low pressure polyethylene and barrel temperature at an extrusion pressure of 1442 kp./sq. cm. (FIG. 1) and the relationship between flowability of polypropylene and low pressure polyethylene and the extrusion pressure at a barrel temperature of 260° C. (FIG. 2).

The values given in said curves have been determined by the so-called spiral flow test.

In these figures,

Curve $a$ illustrates the flowability of polypropylene
$i_5$ (250° C.)=11.3 g./10 minutes, $d$=0.906 g./cc.
Curve $b$ the flowability of polypropylene
$i_5$ (250° C.)=2.8 g./10 minutes, $d$=0.950 g./cc.
Curve $c$ the flowability of low-pressure polyethylene
$i_5$ (190° C.)=26.1 g./10 minutes, $d$=0.950 g./cc.
Curve $d$ the flowability of low-pressure polyethylene
$i_5$ (190° C.)=1.3 g./10 minutes, $d$=0.950 g./cc.

The ordinates indicate the length of the material which flows into the spiral cavity of the test apparatus, i.e. the flowability of the polyolefin, and the abscissas illustrate either the barrel temperature (FIG. 1) or the extrusion pressure (FIG. 2).

Since polyolefins are oleophilic and consequently retain oil particularly well in their pores, substantially any oil, independent of its viscosity, may be used as a lubricant. To uniformly distribute the lubricant in the porous polyolefin, the latter is immersed for about 1 to 24 hours in warm lubricating oil at a temperature between room temperature and 140° C., depending on the nature of the polyolefin. In this manner, an oil absorption of the polyolefin of up to about 25% by weight of oil, calculated on the polyolefin, can be obtained.

The bearings obtained in accordance with the invention are maintenance-free up to medium sliding speeds under loads that are appropriate for the material. They are self-lubricating and retain their good properties even under unfavorable external operating conditions. Furthermore, the properties of polyolefins, when operating without lubrication, are superior to those of the materials commonly used for bearings.

The following examples serve to illustrate the present invention without, however, limiting the same thereto.

Example 1

1000 g. of polypropylene of the specific gravity 0.91 are milled with the amounts of azo-dicarbonamide given in the following Table I at 190° C. to produce an intimate mixture of polypropylene and blowing agent. The mixture is then molded to the desired bearing by processing it in a conventional transfer mold.

TABLE I

| Polypropylene (g.) | Blowing agent | | Molding temperatures (° C.) | Amount of pores (percent) |
|---|---|---|---|---|
| | G. | Percent | | |
| 1,000 | | | 210 | |
| 1,000 | 1 | 0.1 | 210 | 0.5 |
| 1,000 | 0 | 0.1 | 270 | 2 |
| 1,000 | 10 | 1 | 210 | 4 |
| 1,000 | 10 | 1 | 270 | 10 |
| 1,000 | 40 | 4 | 210 | 16 |
| 1,000 | 40 | 4 | 270 | 40 |

Example 2

1000 g. of low-pressure polyethylene of the specific gravity 0.95 are milled with the amounts of trihydrazinotriazine given in the following Table II at 180° C. to produce an intimate mixture of such polyethylene and blowing agent. The mixture is then molded to the desired bearing by processing it in a conventional transfer mold.

TABLE II

| Polyethylene (g.) | Blowing agent | | Molding temperatures (° C.) | Amount of pores (percent) |
|---|---|---|---|---|
| | G. | Percent | | |
| 1,000 | | | 230 | |
| 1,000 | 1.5 | 0.15 | 230 | 1 |
| 1,000 | 1.5 | 0.15 | 285 | 4 |
| 1,000 | 15 | 1.5 | 230 | 6 |
| 1,000 | 15 | 1.5 | 285 | 15 |
| 1,000 | 25 | 2.5 | 230 | 10 |
| 1,000 | 25 | 2.5 | 285 | 25 |

Example 3

When adding approximately the same amount of the activator urea to the mixture of Example 1, the molding temperature can be reduced from 210° C. to about 180° C. and from 270° C. to about 230° C. whereby porous polypropylene bearings of about the same degree of porosity are obtained as given in Table I.

Example 4

Semi-finished articles which can readily be machined to bearings and parts of bearings are obtained by extruding the polypropylene-blowing agent mixtures according to Example 1 through an extruder provided with a single thread decreasing pitch screw whereby the barrel as well as the extrusion head are heated to a temperature between 270° C. and 300° C.

Example 5

Bearings obtained according to Example 1 which are either non-porous or of different degree of porosity as indicated in Table I are immersed into spindle oil at a temperature of 100° C.

It was found that bearings of a weight of 3.25 g. absorbed between about 1.5% and about 20% of the spindle oil, depending upon the degree of porosity, within about 24 hours. Preferably the bearings are immersed immediately after removal from the mold, i.e., while still hot. The amount of spindle oil which diffuses into the bearings and their pores is higher when cooling the bearings in the oil than when immersing cold bearings into the hot oil.

Example 6

Bearing bushings of 6,6-polyamide, 6-polyamide and polypropylene obtained by extrusion or injection-molding were tested on an Almen-Wieland apparatus as a comparison experiment.

Test data:
  Sliding rate: $v = 7.0$ cm./sec.
  Load: $p = 0$ to 90 kp./Cm.$^2$

The load was increased after every five minutes of operating time, since the bearings operate at steady conditions after a much shorter time. The loads applied are shown in FIG. 1 of the accompanying graphs.

Dimensions of the bearing:
  d.=6.3 mm.
  l.=13.0 mm.
Material:
  (1) 6-polyamide
  (2) 6:6-polyamide
  (3) Polypropylene
Material of the shaft: Tempered and polished steel, medium roughness (peak-to-valley height) 5 to 8 μm.—new test shaft was used in each test.
Lubrication: Without lubrication—before the test the slide faces were freed from possibly adhering traces of grease by means of a solvent.

As shown by curves 1 and 2 of FIG. 3, a low coefficient of friction was measured in all tests on bearing bushings of polyamide in the case of low loads. However, it seems to be so conditioned by the material that, after a load limit has been attained which depends on the type of material used, the frictional value is subject to greater fluctuations and rises to higher values. Simultaneously an increase in the temperature was observed (curves 1 and 2 of FIG. 4). Dismantled bearings showed that at this limit the plastic material apparently sustains damage due to thermal influences, which also affects the sliding partner, i.e. the test shaft. The test shaft underwent a light brown discoloration and showed traces of deposited plastic material on its surface. The coefficient of friction decreased again only after the material had passed this load limit. However, the coefficient of friction no longer attained its initial value in the examined range.

The bearing bushings of polypropylene according to the invention showed in the beginning of the test a relatively high coefficient of friction (curve 3 of FIG. 3). When the load increased, however, the coefficient of friction decreased rapidly and approached a limit. This course which is well reproducible did not show a critical load limit, at least not with respect to the sliding properties. The dismantled bearings had a surface as smooth as a mirror and no changes were observed on the slide faces of the test shafts. Deposits of the plastic material and discolorations did not occur. Also the values of the medium temperature of the bearing bushings were lower than those of the bearing bushings of polyamide tested under the same conditions (curve 3 of FIG. 4). The tests showed that when slide elements of polyamide are installed in machinery and apparatus, an unstable sliding behavior is to be expected when a range of load is attained that is characteristic of each type. It is probable that the specific frictional force expressed by the equation $$N_R = u \cdot p \cdot v \frac{kp \cdot m}{cm.^2 \cdot s}$$

is a characteristic value thereof.
  In the above equation $N_R$ stands for frictional force
$u$ stands for coefficient of friction
$p$ stands for medium pressure per unit of area
$v$ stands for speed.

When this effect is superimposed by a diminution of the bearing clearance which is due to a swelling of the bushing owing to the absorption of water, the bearing might not be capable of withstanding the stresses to which it is exposed and loses its capability of operating. Seizing of the shaft is to be expected in the worst case, which actually happened in practice.

The disadvantages mentioned above are not to be expected when bearing bushings of polypropylene are used. They are not subject to changes with respect to their dimensions or strength due to the moisture contents of their surroundings. Deformations are to be expected only when the material is exposed to loads that are not appropriate for the material involved. Even in such a case the slide guide remains capable of operating, although to a limited extent only, this allowing a certain latitude of taking countermeasures in time. A blocking of the slide guides is not to be expected.

Example 7

The sliding behavior of bearing bodies obtained by the method of extrusion or injection-molding a polyolefin containing azo-dicarbonamide as expanding agent and subsequently filling the pores of the obtained porous shaped body with a flowable lubricant was examined on a test bench (Almen-Wieland) under the following conditions:

Sliding rate: $v = 7.0$ cm./sec.
Load: $p = 0$ to 60 kp./cm.$^2$

The load was increased after every 5 minutes operating time since the bearings remain in steady conditions already after a much shorter time. The loads applied are shown in the accompanying FIG. 5.

Dimensions of the bearing:
 d.=6.3 mm.
 l.=13.0 mm.
Material:
 (a) polypropylene
 (b) polypropylene foamed and stored in oil
Material of the shaft: Tempered and polished steel (medium roughness (peak-to-valley height) 6 to 8 μm.)
Lubrication: No additional lubrication The test results of polypropylene and of oil-containing polypropylene are shown by the lines plotted in the accompanying FIG. 5. In the case of pure polypropylene a noticeable decrease of the coefficient of friction is observed (curve $a$ of FIG. 5). This decrease diminishes continuously until the coefficient of friction has attained a limit.

Even when the bearing was highly overloaded, "seizing" of the shaft was not observed. In the present case the thermal load was so insignificant that tempering colors were not observed on the surface of the shaft. The outstanding advantage of oil-containing porous polypropylene bearings (curve $b$ of FIG. 5) is that even in the case of low loads a low coefficient of friction prevails. The sliding behavior of a sliding sleeve of this type corresponds in this range of the behavior of a sleeve made of polyamide with the difference, however, that changes in the properties and in the measurements due to the absorption of water need not be taken into consideration.

The sliding behavior of such sliding sleeves corresponds to that of a polyamide sleeve, the dimensions and properties of the sliding sleeve of the invention not being changed, however, by the absorption of water.

The slide guides of the invention can be used with special advantage in the construction of precision instruments and working machinery, for example household machines. They will also be of great interest for the engineering industry in general.

The flowable lubricant used in practicing the invention can be any material having lubricating properties for diminishing friction between moving surfaces, especially of machine parts. The selection of a suitable flowable lubricant is limited only by (a) its chemical properties in relation to the surfaces, including those of the polyolefin, which are to be lubricated, (b) the service conditions under which it is to be used, and (c) its flow-characteristics insofar as they affect the capability of the lubricant to impregnate the closed-pore porous polyolefins to which the invention is directed and subsequently to exude from the pores when such a polyolefin is used as a bearing material.

The lubricant should be substantially incapable of acting as a solvent for either the polyolefin or for the other materials with which the lubricated polyolefin is placed in contact under normal operating conditions. It should be substantially chemically inert, i.e., incapable of chemical reaction with either the polyolefin or the other materials under expected operating conditions.

The lubricant should be capable of lubricating the surface of the polyolefin and of the other materials with which it is placed in contact at the extremes of temperatures, pressures, and humidity to which a self-lubricating bearing material prepared according to the invention will be subjected in service. It is contemplated that services at temperatures as low as $-100°$ C. and as high as the heat distortion temperature of the polyolefin will be encountered. Examples of heat distortion temperatures at 66 p.s.i. are 140–180° F. for linear polyethylene, 105–121° F. for branched polyethylene and 210–230° F. for polypropylene. Pressures may range from less than atmospheric to super-atmospheric. Humidity may range from 0 to 100% relative humidity. A lubricant suitable for a particular combination of conditions can be selected from the many that are known.

The flowable lubricant should be chemically inert with respect to a metal or other material forming the bearing surface opposite to the polyolefin surface, as well as with respect to the polyolefin itself, in order to avoid corrosion of the metal, or the formation of abrasive or erodable chemical compounds.

Mineral lubricants are preferred; they include mineral oils refined from petroleum crude oils, e.g., hydrocarbons having a viscosity in the range of an oil. In addition to the naturally occurring stable, flowable lubricants, synthetic lubricants having equivalent properties can also be used advantageously for practice of the invention.

Of course, many changes and variations in the polypropylene and low-pressure polyethylene used and their properties, in the blowing agents and activators added and their amounts, in the manner in which the bearings and parts of bearings according to the present invention are produced machined, in the impregnation of such bearings and parts thereof with the lubricant, and the like may be made by those skilled in the art in accordance with the principles set forth herein and in the claims annexed hereto.

We claim:
1. A self-lubricating bearing or slide guide comprising a porous polyolefin plastic having distributed therein closed pores containing a flowable lubricant, the polyolefin being polypropylene or low-pressure polyethylene, the number of pores therein being insufficient to substantially affect the hardness and rigidity of the polyolefin.

2. A self-lubricating bearing or slide guide comprising a porous polypropylene having distributed therein closed pores containing from about 1.5 to about 20% by weight of a flowable lubricant, the number of pores therein being insufficient to substantially affect the hardness and rigidity of the polyolefin.

3. A self-lubricating bearing or slide guide comprising a porous polyolefin plastic selected from the group consisting of polypropylene and low-pressure polyethylene, said plastic having distributed therein closed pores impregnated with a flowable lubricant.

4. A self-lubricating bearing or slide guide comprising a porous polypropylene having distributed therein closed pores which pores contain a flowable lubricant.

5. A self-lubricating bearing or slide guide comprising a porous polypropylene whose closed pores contain a liquid lubricant.

6. A bearing or slide guide comprising a porous, rigid, polypropylene or low-pressure polyethylene plastic in which the plastic defines closed pores and a flowable lubricant contained in the pores.

7. The bearing of claim 6 in which the porosity is in the range of about 0.5 to 40% by volume.

8. As an article of manufacture, a porous oleophilic polyolefin having distributed therein closed pores containing a flowable lubricant.

9. The self-lubricating, rigid bearing or slide guide which comprises one of the following plastics: polypropylene, low-pressure polyethylene or a copolymer thereof with a copolymerizable tetrafluoroethylene, trifluorochloroethylene, or trifluoroethylene, said plastics having distributed therein closed pores containing a flowable lubricant.

10. The bearing of claim 9 in which the closed-pored polyethylene has a specific gravity of about 0.94 to about 0.96 and a crystallinity of about 60 to 75%.

11. A process which comprises moving a bearing provided with a bearing-carrying surface with respect to and in slidable contact with a movable means, said bearing comprising a porous, rigid polypropylene or low-pressure polyethylene plastic in which the plastic defines closed pores and a flowable lubricant contained in the pores and continuously supplying the lubricant from the pores to the bearing surface in controlled amount during the moving of the bearing, thereby keeping it continuously but not excessively lubricated.

12. The process of claim 11 in which the bearing is moved under pressure.

13. The process of claim 11 in which the bearing is moved with generation of heat of friction.

14. The process of claim 11 in which the bearing is moved with generation of heat and under pressure.

15. A self-lubricating bearing or slide guide of claim 1 which is extrusion or injection molded.

References Cited

UNITED STATES PATENTS

| | | | |
|---|---|---|---|
| 2,246,092 | 6/1941 | Gilman | 252—12.4 |
| 3,017,371 | 1/1962 | Hohenberg et al. | |
| 3,190,842 | 6/1965 | Ringwood et al. | 260—2.5 |
| 3,213,071 | 10/1965 | Campbell | 260—2.5 |
| 3,194,759 | 7/1965 | Devine et al. | 252—12 |
| 3,224,967 | 12/1965 | Battista | 252—12.2 |
| 3,288,615 | 11/1966 | Estes et al. | 252—12.2 |

DANIEL E. WYMAN, *Primary Examiner.*

IRVING VAUGHN, *Assistant Examiner.*

U.S. Cl. X.R.

260—2.5